Dec. 10, 1963   G. BAYARD   3,113,440
CONDITIONING SYSTEM FOR COOLING HEATED EQUIPMENT
Filed May 7, 1962
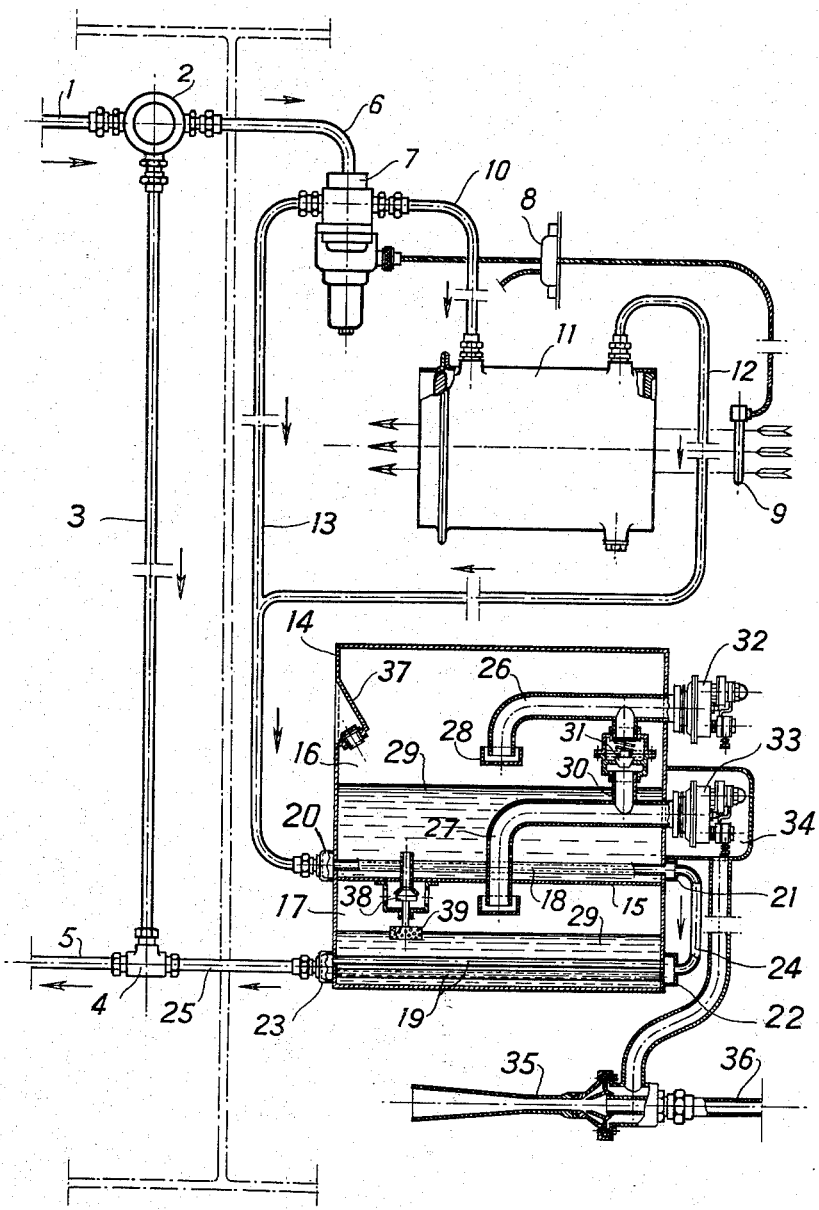
INVENTOR
GASTON BAYARD
BY  Irvin S. Thompson
ATTORNEY

3,113,440
CONDITIONING SYSTEM FOR COOLING HEATED EQUIPMENT

Gaston Bayard, Haute-Garonne, France, assignor to Westland S.A., Geneva, Switzerland, a corporation of France
Filed May 7, 1962, Ser. No. 192,777
5 Claims. (Cl. 62—170)

This invention is to provide conditioning means to ensure the cooling of certain aircraft equipment which may be subjected to an increase in heat such as, for instance, an electronic equipment housed inside a casing.

According to my invention, said equipment is cooled by means of the flow of a liquid adapted to absorb not only the heat dissipated directly by said equipment, but also the heat transferred to it under kinetic action.

The absorption of heat by the flowing liquid requires means for cooling the liquid, which cooling is the object of the presently disclosed improved conditioning means. According to this invention, the cooling means includes an air exchanger with a heat-sensitive probe controlling a distributing cock. When the temperature of the cooling air at the input of said exchanger rises above a predetermined value above which there is a risk of heating of the liquid, the distributing cock shifts the liquid flow from the air heat exchanger to two evaporators arranged in series which operate in accordance with the value of the outside pressure.

Another feature of the cooling means is in that it is provided with pressure-regulating means including two regulators. One of the regulators is associated with a collector common to the two evaporators so as to ensure that inside the latter a constant absolute pressure is maintained, this pressure corresponding to a predetermined boiling temperature of the liquid filling the evaporators. The first regulator becomes operative as soon as the outside pressure sinks beneath the value of said predetermined constant value, whereas, whenever the outside pressure rises above said predetermined pressure, the second regulator becomes operative, said regulator being provided on the exhaust stack of the second operator and opening into a chamber subjected to the suction of an extractor.

According to a still further feature of my invention, a non-return valve is inserted in a pipe connecting the first evaporator with the exhaust stack of the second evaporator, said non-return valve being adapted to prevent any suction exerted by said extractor from acting on said first evaporator.

A still further feature of the invention is in that through the evaporators, there extend tubes arranged in series for the passage through them of the liquid to be cooled, said evaporators being located above each other, the first or upper evaporator being the only one provided with means feeding it with the liquid to be evaporated, the feeding of the second evaporator being achieved by the first evaporator by means of a valve controlled by a float positioned in contact with the liquid filling said second evaporator, the feeding being achieved automatically.

The single FIGURE of the accompanying drawing is a diagrammatic showing of the improved arrangement. In the drawing, 1 designates the terminal section of the pipe which feeds the liquid to be cooled to the cooling means. The liquid in pipe 1 is delivered by a pump which is not illustrated. The terminal section of the pipe leads to a three-way valve 2 feeding a by-pass pipe 3 connected with the return pipe, 5 through a T connection 4.

The valve 2 is adapted to feed a pipe 6 which is connected with the admission port of an electrically controlled distributing cock 7, also of a three-way type, controlled through a relay box 8 by a heat-sensitive probe 9 permanently subjected to the temperature of the outside air.

The cock 7 feeds a first outlet pipe 10 connected with the input of a heat exchanger 11 of a conventional type, illustrated, in the present case, as a cylindrical chamber through which passes, parallel to the longitudinal axes of the exchanger, a bundle of tubes conveying a stream of fresh air and round which the liquid to be cooled flows.

A pipe 12 connects the outlet of said heat exchanger with a point on a pipe 13 which is connected with the second outlet of the distributing cock 7. The flow through said two pipes 12 and 13 passes into the first of two evaporators 16 and 17.

The two evaporators are, in the present case, formed inside a cylindrical vat 14 which is subdivided by a horizontal partition 15 into two superposed evaporator compartments 16 and 17, with two bundles of parallel tubes 18 and 19 which extend in proximity with the bottom sections of the corresponding compartments.

The tubes 18 and 19 are disposed between collecting manifolds 20—21 and 22—23, respectively. The pipe 13 feeds the first input manifold 20, while the intermediate manifolds 21, 22 are connected through a connecting pipe 24 and a pipe connection 25 connects the second output manifold 25 to the T connection 4 and with the return pipe 5.

The two superposed compartments 16 and 17 forming the evaporators have disposed therein exhaust stacks 26 and 27, respectively, the lower ends of which open into protecting cups 28 adapted to prevent any accidental loss of the liquid to be evaporated.

The exhaust stacks 26 and 27 are interconnected by a pipe 30 which pipe is adapted to be closed by a non-return valve 31 positioned so as to prevent any flow of gas from the stack 26 towards the stack 27, said valve when open being adapted to make the first evaporator act as a collector common to both evaporators.

At the output end of the stack 26 is inserted a pressure regulator 32 opening directly into the outside atmosphere, whereas a second regulator 33 controlling the stack 27 opens in a chamber 34 which chamber is associated with an extractor.

Where the cooling means is used for cooling an equipment carried by an aircraft, the extractor comprises a nozzle 35 fed through a pipe 36 with air tapped off under dynamic pressure conditions from the air which serves also for supplying cooling air to the heat exchanger 11. The extractor generates a reduced pressure in the second evaporator 17 so as to lower the boiling temperature of the liquid contained therein down to a value consistent with the requirements of cooling of the cooling liquid which is flowing through the apparatus.

The apparatus also includes a filling port 37 in the first evaporator 16. A connecting valve 38 is disposed between the evaporators and the valve is controlled by a float 39 floating on the surface of the liquid filling the second evaporator 17 which is thus fed automatically from the first evaporator by lowering of the liquid level in the second evaporator.

The operation of the present apparatus will now be disclosed. A few specific values will be given which values are pertinent to an arrangement adapted to cool an electronic equipment housed inside a casing located at the end of an aircraft wing.

There will be first disclosed how the heat exchanger 11 operates with changes in the temperature of the cooling air sucked through said exchanger and there will then be described the different stages of operation of the first and second vaporators with changes in the outside pressure, so as to produce and to maintain inside each of said evaporators a constant predetermined absolute pressure corresponding to a predetermined boiling temperature of the liquid subjected to evaporation.

In one specific embodiment a cooling liquid that sold under the registered trademark Coolanol is used, the specific heat of which is 0.47 kilo-calorie per kg. and per ° C., the coolant temperature at the input of the cooling system is at a maximum of 80° C. and at the output of the cooling system is at a maximum of 60° C. The evaporators are filled with methyl alcohol having a boiling point at sea level equal to 65° C.

As a matter of fact, the operation of the cooling system includes three principal stages the operation of each stage being dependent upon the conditions of flight of the aircraft as defined by altitude and air temperature, which temperature depends directly on the speed of said aircraft.

When the air temperature is lower than 50° C., the distributing cock 7, controlled by the heat-sensitive probe 9, assumes a position so as to open the circuit feeding the air-fed heat exchanger 11, the latter being suitably designed so as to ensure the cooling of the coolant to the desired extent.

When the air temperature reaches a value above 50° C., the heat exchanger 11 is no longer capable of cooling the coolant and it may, in fact, under certain conditions, heat the latter. Under such conditions the heat-sensitive probe 9 acts to urge the distributing cock 7 into a position to disconnect the heat exchanger 11 and cause the coolant to flow directly into the pipe 13 and thence into the first evaporator 16 of the two evaporators disposed in series.

As said altitude increases, the boiling temperature of methylic alcohol is lowered and, consequently, there would be established an unnecessarily low temperature inside the casing containing the equipment to be cooled and furthermore there would be a prohibitive increase in the consumption of alcohol were it not for the presence of the pressure regulator.

The pressure regulator causes pressure to be applied to the evaporators, which is obtained by producing above the surface of the liquid to be evaporated, an effective pressure of 700 gr. per sq. cm., corresponding to the conditions prevailing at an altitude of 3,000 meters.

Consequently, when the aircraft rises above said altitude, the regulator 32 fitted on the stack 26 forming an exhaust collector common to the two evaporators, maintains inside the evaporators the pressure of 700 gr. per sq. cm. and provides for the exhaust of the alcohol vapors.

The two evaporators operate in this stage in an identical manner so as to maintain the boiling temperature of the alcohol at a value of 55° C., which ensures the output of the coolant at a temperature under 60° C.

When the aircraft flies at an altitude less than 3,000 meters, the resultant rise in the boiling temperature of the alcohol would not allow the output temperature of the coolant to be about 60° C. without modification in the operation of the evaporators.

The first evaporator 16 is set directly in communication with the outer atmosphere through the agency of the pressure regulator 32 which is constantly open at the lower altitude.

Under such conditions, the boiling temperature of the alcohol in said first evaporator 16 varies within the range of 55 to 65° C., corresponding respectively to an altitude of 3,000 meters and to sea level and said evaporator produces a cooling of the coolant down to a temperature ranging between 60 and 67° C.

However, the second evaporator 17 is subjected to a reduced pressure through the regulator 33 which provides for the exhaust of the vapors into the chamber 34 which is subjected to the suction of the extractor 35, which artificially restores the pressure in the evaporator to a value equal to 700 gr. per sq. cm. corresponding to an altitude of 3,000 meters. Thus, the boiling temperature of the alcohol is returned to 55° C. and the output of the coolant is at a temperature of 60° C., as desired.

In this latter situation, the non-return valve 31 closing the pipe 30 connecting the two stacks 26 and 27, remains in its closed position, and prevents the extractor from sucking vapors out of the first evaporator 16.

Many modifications and variations of the present invention are possible in light of the teachings. What is claimed as new and is desired to be secured by Letters Patent is:

1. A conditioning system for cooling the liquid adapted to cool heated equipment, comprising a heat exchanger, means feeding said heat exchanger with a stream of air, a circuit including a section feeding a stream of the cooling liquid through said heat exchanger to be cooled by said stream of air and a section by-passing said first mentioned section, means subjected to the temperature of the air entering the heat exchanger and adapted to divert the stream of cooling fluid out of the first mentioned section of the circuit into the by-passing section whenever the temperature of the air in contact with said last-mentioned means rises above a predetermined value, two evaporators inserted in series in the circuit on the downstream side of said two sections, liquid in said evaporators, and means whereby the pressure on the outside of the system is adapted to control the boiling temperature of the liquid in the evaporators.

2. A conditioning system for cooling the liquid adapted to cool heated equipment, comprising a heat exchanger, means feeding said heat exchanger with a stream of air, a circuit including a section feeding a stream of the cooling liquid through said heat exchanger to be cooled by said stream of air and a section by-passing said first-mentioned section, a distributing cock controlling the insertion of said sections selectively in said circuit, a heat-sensitive probe subjected to the temperature of the air entering the heat exchanger and controlling the distributing cock, to divert the stream of cooling fluid out of the first-mentioned section of the circuit into the by-passing section whenever the temperature of the air in contact with said last-mentioned means rises above a predetermined value, two evaporators inserted in series in the circuit on the downstream side of said two sections, liquid in said evaporators, and means whereby the pressure on the outside of the system is adapted to control the boiling temperature of the liquid in the evaporators.

3. A conditioning system for cooling the liquid adapted to cool heated equipment, comprising a heat exchanger, means feeding said heat exchanger with a stream of air, a circuit including a section feeding a stream of the cooling liquid through said heat exchanger to be cooled by said stream of air and a section by-passing said first mentioned section, means subjected to the temperature of the air entering the heat exchanger and adapted to divert the stream of cooling fluid out of the first mentioned section of the circuit into the by-passing section whenever the temperature of the air in contact with said last-mentioned means rises above a predetermined value, two evaporators inserted in series in the circuit on the downstream side of said two sections, liquid in said evaporators, and means whereby the pressure on the outside of the system is adapted to control the boiling temperature of the liquid in the evaporators, an exhaust stack for each evaporator, means collecting the vapors out of both evaporators, a first regulator controlled by the vapors in said last-mentioned means and adapted to maintain a constant absolute pressure in the evaporators corresponding to a predetermined boiling temperature for the liquid carried in the latter, said first regulator starting operation as soon as said outer pressure sinks beneath a predetermined value, a second regulator carried by the exhaust stack of the second evaporator, and extractor controlling said second regulator and adapted to maintain a predetermined value for the boiling temperature inside said second evaporator as soon as the outer pressure rises above said predetermined value.

4. A conditioning system for cooling the liquid adapted to cool heated equipment, comprising a heat exchanger, means feeding said heat exchanger with a stream of air, a circuit including a section feeding a stream of the cooling liquid through said heat exchanger to be cooled by said stream of air and a section by-passing said first-mentioned section, means subjected to the temperature of the air entering the heat exchanger and adapted to divert the stream of cooling fluid out of the first-mentioned section of the circuit into the by-passing section whenever the temperature of the air in contact with said last-mentioned means rises above a predetermined value, two evaporators inserted in series in the circuit on the downstream side of said two sections, liquid in said evaporators, means whereby the pressure on the outside of the system is adapted to control the boiling temperature of the liquid in the evaporators, an exhaust stack for each evaporator, means collecting the vapors out of both evaporators, a first regulator controlled by the vapors in said last-mentioned means and adapted to maintain a constant absolute pressure in the evaporators corresponding to a predetermined boiling temperature for the liquid carried in the latter, said first regulator starting operation as soon as said outer pressure sinks beneath a predetermined value, a second regulator carried by the exhaust stack of the second evaporator, an extractor controlling said second regulator and adapted to maintain a predetermined value for the boiling temperature inside said second evaporator as soon as the outer pressure rises above said predetermined value, a duct interconnecting the two stacks, a non-return valve inserted in said duct and adapted, whenever the extractor is not operative to open the duct, to allow the vapors from the stack of the second evaporator to enter the stack of the first evaporator and the means collecting the vapors from both evaporators, and a spring closing the non-return valve whenever the extractor becomes operative, to prevent the latter from sucking vapors out of the first evaporator.

5. A conditioning system for cooling the liquid adapted to cool heated equipment, comprising a heat exchanger, means feeding said heat exchanger with a stream of air, a circuit including a section feeding a stream of the cooling liquid through said heat exchanger to be cooled by said stream of air and a section by-passing said first-mentioned section, means subjected to the temperature of the air entering the heat exchanger and adapted to divert the stream of cooling fluid out of the first-mentioned section of the circuit into the by-passing section whenever the temperature of the air in contact with said last-mentioned means rises above a predetermined value, two superposed evaporators inserted in series in the circuit on the downstream side of said two sections, the upper evaporator being inserted in the evaporator ahead of the second circuit, means for pouring cooling liquid into the first evaporator, connecting means through which the first evaporator is adapted to feed liquid into the second evaporator, a float carried by the liquid in the second evaporator and controlling said last-mentioned means, and means whereby the pressure on the outside of the system is adapted to control the boiling temperature of the liquid in the evaporators.

References Cited in the file of this patent

UNITED STATES PATENTS

| 1,777,843 | Glisci | Oct. 7, 1930 |
| 2,922,291 | Fox | Jan. 26, 1960 |

FOREIGN PATENTS

| 371,676 | Great Britain | Apr. 28, 1932 |